US012739579B2

(12) United States Patent
Merkl et al.

(10) Patent No.: US 12,739,579 B2
(45) Date of Patent: Sep. 15, 2026

(54) HEARING INSTRUMENT AND ASSOCIATED BINAURAL HEARING SYSTEM

(71) Applicant: Sivantos Pte. Ltd., Singapore (SG)

(72) Inventors: Tobias Merkl, Erlangen (DE); Pascal Schreiber, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 169 days.

(21) Appl. No.: 18/644,388

(22) Filed: Apr. 24, 2024

(65) Prior Publication Data

US 2024/0357300 A1 Oct. 24, 2024

(30) Foreign Application Priority Data

Apr. 24, 2023 (DE) ..................... 10 2023 203 766.1

(51) Int. Cl.
*H04R 25/00* (2006.01)

(52) U.S. Cl.
CPC ......... *H04R 25/652* (2013.01); *H04R 25/456* (2013.01); *H04R 25/60* (2013.01); *H04R 2225/025* (2013.01); *H04R 2225/77* (2013.01)

(58) Field of Classification Search
CPC .... H04R 25/652; H04R 25/456; H04R 25/60; H04R 2225/77; H04R 2225/025; H04R 25/604; H04R 25/00; H04T 25/456; H04T 25/60; H04T 25/604
USPC ......................................... 381/312, 322, 324
See application file for complete search history.

(56) References Cited

U.S. PATENT DOCUMENTS

| | | | |
|---|---|---|---|
| 7,181,171 B2 | 2/2007 | Forrester | |
| 9,142,887 B2 | 9/2015 | Tikka et al. | |
| 2020/0260193 A1* | 8/2020 | Collado Bonet | .... H04R 25/405 |

FOREIGN PATENT DOCUMENTS

| | | | |
|---|---|---|---|
| DE | 3502178 | A1 | 8/1985 |
| DE | 60209228 | T2 | 11/2006 |
| DE | 202021101000 | U1 | 6/2021 |
| WO | 2010121914 | A1 | 10/2010 |
| WO | 2022197562 | A1 | 9/2022 |

* cited by examiner

*Primary Examiner* — George C Monikang

(74) *Attorney, Agent, or Firm* — Laurence A. Greenberg; Werner H. Stemer; Ralph E. Locher

(57) ABSTRACT

A hearing instrument has a housing which is wearable in an ear and which includes a concha portion and a thin canal portion protruding from the concha portion. The canal portion has a twice-curved shape to fit to the anatomy of the auditory canal. A damping body is inserted in the canal portion which is made of an elastic material to mount a receiver in vibration-damping fashion. The damping body has a pocket for accommodating the receiver and an adjoining sound tube. The sound tube is angled at a first angle with respect to a longitudinal axis of the pocket, thereby forming a bend in the damping body, and its end distant from the pocket terminates in a support plate which rests on a shoulder of the canal portion. The support plate is angled obliquely with respect to an axis of the sound tube.

12 Claims, 7 Drawing Sheets

Fig. 13
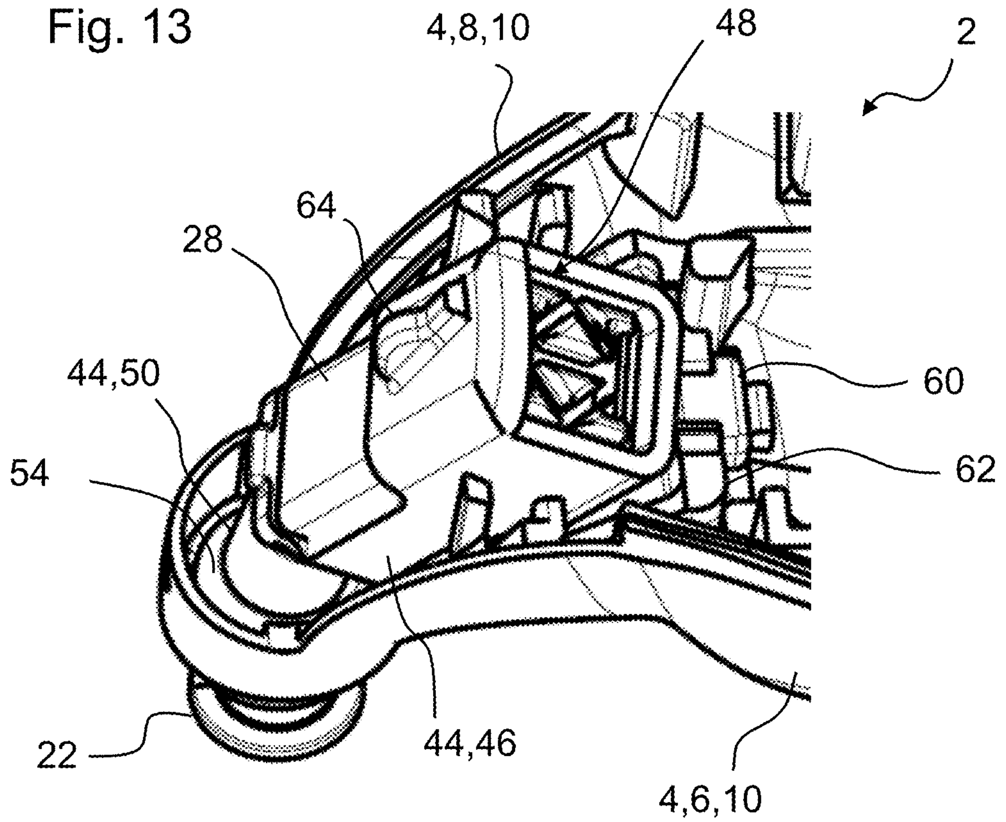
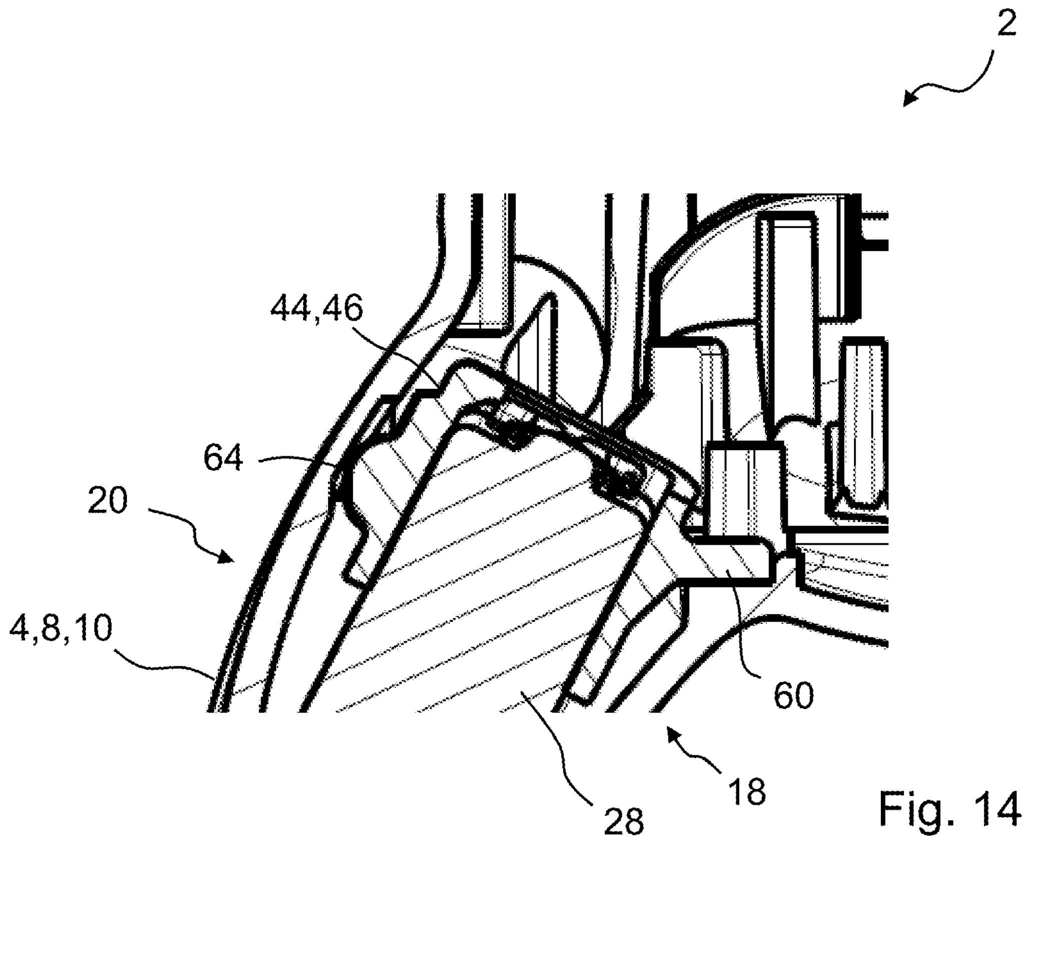
Fig. 14

HEARING INSTRUMENT AND ASSOCIATED BINAURAL HEARING SYSTEM

FIELD AND BACKGROUND OF THE INVENTION

The invention relates to a hearing instrument having a housing which is wearable in an ear of a user and which comprises a concha portion and a thin canal portion protruding from the concha portion. The invention also relates to an associated binaural hearing device system.

A hearing instrument generally refers to an electronic device that assists a person wearing the hearing instrument (who is referred to as "wearer" or "user" below) with hearing. In particular, the invention relates to hearing instruments that are configured to fully or partly compensate for a loss of hearing of a hearing-impaired user. Such a hearing instrument is also referred to as "hearing aid." Additionally, there are hearing instruments that protect or improve the ability of users with normal hearing to hear, for example enable improved speech comprehension in complex hearing situations. Such hearing instruments are also referred to as personal sound amplification products (PSAP). Additionally, the term "hearing instrument" also includes headphones with active noise suppression (especially so-called earplugs, i.e., headphones worn within the ear), headsets, etc.

Hearing instruments in general, and specifically hearing aids, are usually designed to be worn on the head of the user and, in particular, in or on an ear in this case, in particular as behind-the-ear devices (BTE devices) or in-the-ear devices (ITE devices). The present invention relates to the latter style of hearing instruments, i.e., ITE devices. Such ITE devices frequently have a housing with a bulging (often approximately hemispherical) housing main part and a thin housing extension (often shaped like an arm) protruding therefrom. In this context, the bulging housing main part is adapted to be worn in the concha and is therefore also referred to here as "concha portion" of the housing. By contrast, the thin housing extension is designed to reach into the auditory canal (canal) and is therefore also referred to here as "canal portion".

In terms of their internal structure, hearing instruments of the type described above regularly comprise at least one (acousto-electric) input transducer, a signal processing unit (signal processor), and an output transducer. During the operation of the hearing instrument, the input transducer or each input transducer records airborne sound from the surroundings of the hearing instrument and converts this airborne sound into an input audio signal (i.e., an electric signal, which transports information about the ambient sound). The input audio signal or each input audio signal is processed in the signal processing unit (i.e., modified in terms of its sound information) in order to assist the ability of the user to hear, in particular to compensate for a loss of hearing of the user. The signal processing unit outputs an appropriately processed audio signal to the output transducer. In some applications the signal processing additionally outputs the input audio signal in original or modified form to an external electronic device (peripheral device, e.g., a further hearing instrument or a smartphone of the user) and/or receives a further input audio signal from the peripheral device. The data transfer between the hearing instrument and the peripheral device is regularly implemented wirelessly, e.g., using Bluetooth technology, in modern hearing instruments. Modern hearing instruments therefore often also comprise an antenna for wireless transmission and reception of data.

In most cases, the output transducer is in the form of an electro-acoustic transducer, which converts the (electric) output audio signal back into airborne sound, wherein this airborne sound—which is being modified in relation to the ambient sound—is output into the auditory canal of the user. Such electro-acoustic transducers are also referred to as "receivers".

In recent times, increasing numbers of hearing instruments are produced with a rechargeable battery. In this case, the battery is recharged either wirelessly or by means of a galvanic charging connector. In general, a charging connector refers to a piece of electric equipment for supplying a charging current, i.e., an electric current for charging the rechargeable battery of the hearing instrument. In this context, "galvanic" means that, in contrast to wireless charging, the charging connector enables an electric current flow (i.e., an exchange of electrons) between a charging device or charging cable and the hearing instrument.

Hearing instruments are often produced and sold as a part of a binaural hearing aid system for caring for both ears of the user. As a rule, such a binaural hearing aid system comprises two hearing instruments constructed mirror symmetrically with respect to one another, specifically a first hearing instrument for the left ear of the user and a second hearing instrument for the right ear of the user.

Acoustic feedback is a particular problem in ITE devices on account of the small size of these hearing instruments. In the process, some of the modified ambient sound output by the receiver reaches the at least one microphone of the hearing instrument again and is recorded and amplified anew. Acoustic feedback leads to a deterioration in the sound quality of the output signal and typically to shrill whistling in the output signal which is at the very least perceived as uncomfortable and—in the absence of suitable protection measures—may also endanger the sense of hearing of the user.

SUMMARY OF THE INVENTION

The invention is based on the object of specifying a hearing instrument having a housing that is wearable in an ear of a user (i.e., an ITE device) and particularly low susceptibility to acoustic feedback. In particular, the hearing instrument should also be easy to produce.

This object is achieved according to the invention by the features as claimed. Advantageous embodiments and developments, some of which are inventive on their own, are presented in the dependent claims and the following description.

The hearing instrument comprises a housing which is wearable in an ear of a user and divided into a concha portion and a thin canal portion protruding from the concha portion. In particular, the concha portion has a bulging shape to fit the typical shape of a human concha. The canal portion has a twice curved shape (in different planes) to fit the typical anatomy of the human auditory canal. By preference, the hearing instrument is a standard device (one-size-fits-all device) which is offered to many users with the same housing shape. However, deviating therefrom, the hearing instrument may in principle also be an individually fitted hearing instrument, in which the shape of the concha portion and of the canal portion is accurately fitted to the specific shape of the concha and of the auditory canal of the individual user.

According to the invention, the hearing instrument also comprises a damping body which is made of an elastic material (in particular rubber or a thermoplastic elastomer), serves to mount a receiver of the hearing instrument in vibration-damping fashion and is inserted in the canal portion of the housing. The damping body comprises a pocket for accommodating the receiver and a sound conduction tube (sound tube for short) adjoining this. In this case, the sound tube is angled at a first angle with respect to a longitudinal axis of the pocket, forming a bend in the damping body in the process. The end of the sound tube distant from the pocket terminates in a support plate which rests on a shoulder of the canal portion (formed on an inner wall of the canal portion). Here, the support plate is angled obliquely with respect to an axis of the sound tube.

A starting point of the invention is the thought that positioning the receiver as deeply as possible in the auditory canal (and hence as closely as possible to the eardrum) is advantageous from the point of preventing acoustic feedback since, on the one hand, this reduces the damping of the sound output by the receiver in the hearing instrument and the auditory canal. In turn, this allows the receiver power to be reduced (in comparison with a receiver at a greater distance from the eardrum) while leaving the user's hearing experience unchanged, and hence reduces the risk of feedback already within the scope of sound generation. On the other hand, arranging the receiver as deeply as possible within the auditory canal maximizes the distance of the receiver from the at least one microphone of the hearing instrument, whereby the feedback risk is likewise reduced. However, from a feedback risk point of view, it was recognized that installing the receiver directly and rigidly in the canal portion would be disadvantageous as vibrations of the receiver during sound generation would be effectively introduced into the housing of the hearing instrument in that case and would, from there, be guided as structure-borne sound to the at least one microphone. To avoid this where possible, the receiver is assembled indirectly in the canal portion by way of the interposed damping body, wherein the damping body absorbs the receiver vibrations in full or at least to a great extent (by dissipating the vibration energy) and thus accordingly prevents a structure-borne sound transmission to the housing.

However, it was recognized that an advantageous design of the damping body and the introduction thereof in the canal portion are difficult to realize on account of the complex, twice bent shape of the canal portion. On the one hand, a damping body fully reproducing the twice bent shape of the canal portion, which would therefore be insertable in the canal portion stress-free, cannot be produced, or can only be produced with much outlay, using conventional production methods (e.g., injection molding or compression molding). On the other hand, a damping body with a simpler shape, which reproduces only one or even none of the two curves of the canal portion, can as a rule only be inserted under prestress in the canal portion, and this would lead to a deterioration in the damping properties.

In relation to this dilemma, the invention takes the middle ground by virtue of, as it were, reproducing only one and a half curvatures of the canal portion in the damping body of the hearing instrument according to the invention. A first curve of the canal portion situated closer to the concha portion is fully reproduced at the damping body by way of obliquely shaping the sound tube on the pocket accommodating the receiver. The second curve of the canal portion at a greater distance from the concha portion is only half reproduced by the damping body by means of the support plate being oriented at an angle to the axis of the sound tube. Hence, the damping body itself is curved only once and, with an oblique shoulder formed by the support plate, is incident on the housing wall of the canal portion in the second curve. On the one hand, this shape of the damping body allows a comparatively simple production of the damping body by means of conventional production methods such as, e.g., injection molding or compression molding (as a consequence of the damping body having only one curve). On the other hand, the oblique support plate allows the damping body to be inserted in the twice curved canal portion prestress-free (despite having only one curve). Thus, the shape of the damping body enables a deep arrangement of the receiver in the auditory canal in combination with effective damping of the vibrations of the receiver. Consequently, a particularly low risk of feedback is obtained, while simultaneously having a hearing instrument that can be produced comparatively easily.

In a preferred embodiment of the invention, the support plate is broadened vis-à-vis the sound tube. In other words, it thus has an outer edge which projects beyond an outer circumference of the sound tube. Firstly, the broadened edge of the support plate brings about a particularly stable support of the damping body on the housing wall. Secondly, the broadened support plate allows self-centering of the damping body in the interior of the canal portion, wherein the broadened support plate ensures that the sound tube has enough clear space from the housing wall of the canal portion on all sides so as not to come into sound-transferring contact with this housing wall.

The self-centering effect of the support plate, which is broadened vis-à-vis the sound tube, is preferably further amplified by the design of the canal portion, by virtue of an outer diameter of the support plate corresponding at least approximately to the inner diameter of the canal portion in a region corresponding locally to the support plate. The canal portion and the damping body can be matched to one another within the scope of the invention such that, in the assembly position of the damping body, the support plate completely fills the hollow inner cross section of the canal portion and is thus placed in the canal portion without play or even with slight prestress. However, the outer diameter of the support plate is preferably chosen to be slightly smaller (e.g., by between 5% and 15%, in particular approx. 10%) than the locally corresponding inner diameter of the canal portion. In this embodiment, the support plate is placed in the canal portion with a little play such that the support plate still self-centers the sound tube in the canal portion with sufficient accuracy but in the process does not rest against the housing laterally (in particular not on all sides and not under prestress) in order to minimize the vibration transfer to the housing.

In an advantageous embodiment, the sound tube comprises a sound conduction channel (sound channel for short) which passes through the support plate off center. Guiding the sound channel off-center in relation to the support plate can bring geometric requirements for an advantageous sound guidance in accordance with geometric requirements for an anatomically advantageous design of the canal portion and with geometric requirements with regards to a stable support of the damping body on the canal portion particularly well.

At a longitudinal end of the pocket distant from the sound tube, the damping body in a preferred embodiment of the invention comprises a retaining projection retained in frictionally connected and/or interlocking fashion in a corresponding retaining contour of the housing for the purpose of mounting the damping body on the housing. The retaining projection thus forms a frictional connection and/or interlock element for the mechanical connection between the damping body and the housing A "frictionally connected mount" is understood to mean a connection between the retaining projection of the damping body and the corresponding retaining contour on the housing, in the case of which a relative movement of the retaining projection relative to the retaining contour is prevented or at least made more difficult by frictional forces. In this case, the retaining projection and the corresponding retaining contour rest on one another, in particular while exerting a clamping force on one another, on one or more surfaces which are aligned in parallel with the dynamic (i.e., time-varying) forces which typically act on the retaining projection as a consequence of gravity and the receiver vibrations. The frictionally connected mount is obtained, in particular, by virtue of the retaining projection being pressed into the retaining contour under elastic deformation.

By contrast, an "interlocking mount" is understood to mean a connection between the retaining projection of the damping body and the corresponding retaining contour of the housing, in the case of which a relative movement of the retaining projection relative to the holding contour is prevented by abutting surfaces of the retaining projection and the retaining contour which are aligned at right angles to or obliquely with respect to the force direction, in particular by meshing structures of the retaining projection and the retaining contour or by way of one or more undercuts.

The frictionally connected and the interlocking mount of the retaining projection of the damping body on the corresponding retaining contour of the housing in this case have in common that both compressive forces and tensile forces between the damping body and the housing can be absorbed as a result. In a particularly preferred embodiment of the invention, the retaining projection (a single one in this case) and the support plate form the only two (support) locations at which the damping body is in permanent mechanical contact with the housing, and so the damping body can vibrate largely freely and at least largely without contact with the housing between these support locations.

Optionally, the retaining projection of the damping body is adhesively bonded or welded in the corresponding retaining contour of the housing, and so an integrally bonded connection is also realized between the retaining projection and the retaining contour.

In addition or as an alternative to the above-described retaining projection, at least one outwardly protruding lug is shaped on the pocket of the damping body. The scope of the invention may provide for the at least one lug to rest permanently against an inner wall of the housing for the purpose of damping deflections of the damping body vis-à-vis the housing (e.g., on account of vibrations of the receiver or on account of external shocks). However, the at least one lug is preferably dimensioned such that it is spaced apart (at a distance) from the inner wall of the housing in the rest position of the damping body, i.e., does not rest against the inner wall of the housing, and only abuts against an inner wall of the housing in the case of a deflection of the damping body vis-à-vis the housing. The "rest position" refers to the position of the damping body assumed by the damping body relative to the housing when apart from gravity no accelerations act on the damping body and the housing. A plurality of lugs are shaped on the damping body in certain embodiments of the invention. In this case, provision is optionally made for one or more of these lugs to rest permanently against the inner wall of the housing while at least one further lug only abuts against the inner wall of the housing when the damping body is deflected.

In contrast to the above-described retaining projection which serves as the frictionally connected and/or interlocking mount of the damping body on the housing and can therefore absorb both compressive forces and tensile forces, the lug or each lug is only able to absorb compressive forces between the damping body and the housing. In embodiments of the invention in which the damping body—in addition to the support plate—is only supported on the housing by lugs of the above-described type, a plurality of lugs (in particular at least three lugs) are shaped on the damping body for the purpose of absorbing compressive forces from different directions. However, in preferred embodiments of the invention, the damping body—once again in addition to the support plate—comprises at least one retaining projection and at least one lug of the above-described type to fix said damping body on the housing.

In this case, the damping body is preferably held in the housing as a result of the interaction of the retaining projection with the corresponding retaining contour, in such a way that the lug or each lug does not rest against the housing in a rest position of the damping body and only abuts against the housing in the case of significant deflections of the damping body.

In an advantageous variant of the invention, the retaining projection has a T-shaped embodiment. This design of the retaining projection is advantageous with regards to connecting the damping body in frictionally connected and interlocking fashion to the housing but in the process maintaining sufficient flexibility for dissipating the receiver vibrations.

Advantageously from a vibration point of view, the retaining projection is in particular shaped on the pocket on the (radially) inner side relative to the bend of the damping body. Optionally, a lug of the above-described type is shaped on the outer side of the pocket opposite the retaining projection. One or more lugs of the above-described type are optionally shaped on a longitudinal end of the pocket that faces the sound tube, to be precise on the inside and/or outside vis-à-vis the bend of the damping body in particular.

By preference, in comparison with the receiver, the pocket of the damping body has slightly smaller dimensions than the receiver, and so the receiver must be pushed into the pocket under pressure and is frictionally secured there by the elastic material of the pocket. This ensures without further measures that the receiver does not slip out of the pocket.

In an embodiment, the housing is formed from two assembled housing parts (in particular reversibly assemblable and mutually detachable housing parts), specifically a housing trough and a housing lid. In this case, the two housing parts are fastened to one another in the assembled state by way of latching connections, for example, and consequently are mechanically connected to one another to form the housing which is substantially closed all round (specifically, apart for a number of housing openings for the sound entrance, the sound exit and optionally a charging connector). In an advantageous embodiment variant of the invention, the two housing parts are formed in such a way in this case that they each form a part of the concha portion and a part of the canal portion. In other words, a separation line separating the two housing parts from one another runs both through the concha portion and through the canal portion. During the assembly of the hearing instrument, this facilitates the insertion of the damping body with the receiver pushed therein since taking off the housing lid also opens up the canal portion. Furthermore, a subsequent removal of the damping body and the receiver held therein from the housing is also facilitated, for example for repairing or replacing the receiver.

The housing trough preferably forms a lower side of the concha portion which faces the head of the user in an intended wearing position of the hearing instrument. The housing trough also forms a lower side of the canal portion which adjoins the lower side of the concha portion and on which a connector for connecting an ear dome is also formed. By contrast, the housing lid in this embodiment variant forms an upper side of the concha portion which is distant from the head of the user in the intended wearing position of the hearing instrument. The housing lid also forms an upper side of the canal portion adjoining the upper side of the concha portion.

A further embodiment of the invention relates to a binaural hearing aid system. The latter comprises a first hearing instrument for the left ear of the user and a second hearing instrument for the right ear of the user. In this case, the two hearing instruments are formed with a housing that has a mirrored embodiment but otherwise with (at least substantially) the same design in the manner according to the invention as described above, in particular in the manner of one of the above-described variants of the invention.

An exemplary embodiment of the invention is described in more detail below. In the drawing:

BRIEF DESCRIPTION OF THE FIGURES

FIG. 13 shows a perspective illustration of the canal portion of the hearing instrument according to FIG. 1 with a removed housing lid and the damping body inserted in the canal portion, and the receiver inserted in the damping body, FIG. 14 shows, in an illustration according to FIG. 5, a detailed view of the damping body inserted in the canal portion and of the receiver inserted in the damping body.

Parts and variables corresponding to one another are always provided with the same reference signs in all figures.

DETAILED DESCRIPTION OF THE INVENTION

FIGS. 1 to 14 show a hearing instrument 2 which for example is a hearing aid, i.e., a hearing instrument configured to assist the ability to hear of a user with damaged hearing. In this case, the hearing instrument 2 is embodied as an ITE hearing instrument that is insertable into the ear of a user. The hearing instrument 2 shown in FIGS. 1 to 14 is designed by way of example for insertion in the left ear of the user.

Figure 1:
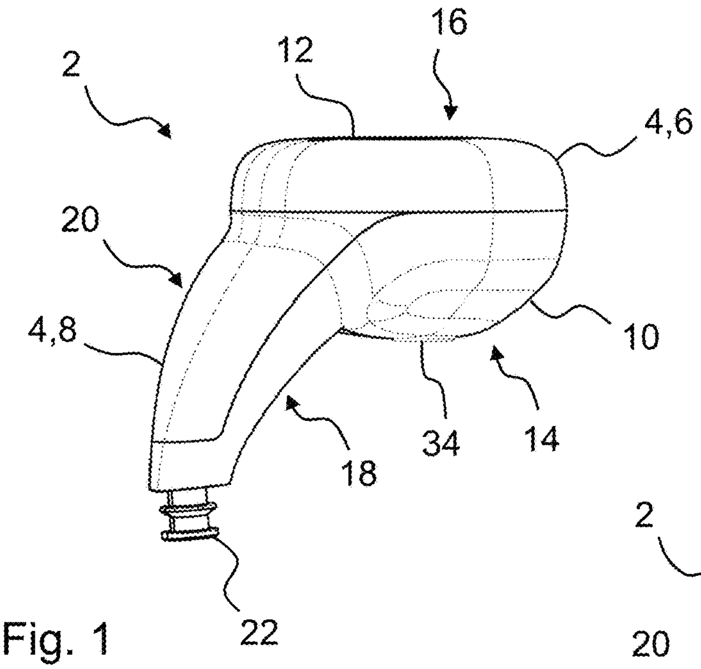
FIG. 1 shows a perspective illustration at an oblique viewing angle of a hearing instrument wearable in the left ear of a user and having a housing which in terms of its shape is divided into a bulging concha portion and into a thin canal portion protruding from the concha portion, with the housing being assembled from two housing parts, specifically a housing trough facing the head of a user in the worn position of the hearing instrument and a housing lid distant from the head of a user in the worn position.
Figure 2:
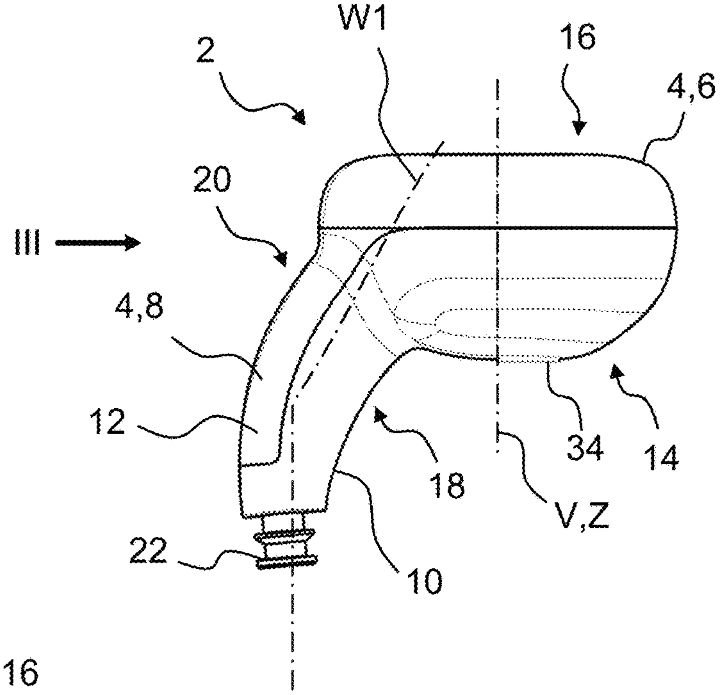
FIG. 2 shows the hearing instrument according to FIG. 1 in plan view II (FIG. 3) transversely to a horizontal plane.
Figure 3:
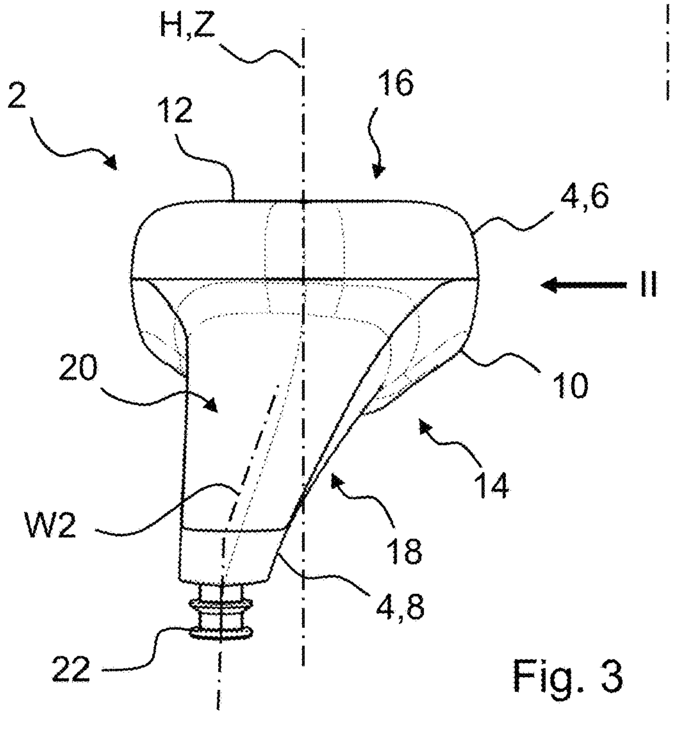
FIG. 3 shows the hearing instrument according to FIG. 1 in plan view III (FIG. 2) transversely to a vertical plane.

According to FIGS. 1 to 3, the hearing instrument 2 comprises a housing 4 which is divided into a concha portion 6 and a canal portion 8 projecting from the concha portion.

FIG. 2 shows the hearing instrument 2 in a plan view transversely to a horizontal plane H. As evident from FIG. 3, the horizontal plane H intersects the concha portion 6 centrally. In an intended wearing position of the hearing instrument 2 in the ear of the user, the horizontal plane H is aligned approximately parallel to the transverse plane of the head of the user, and hence aligned approximately horizontally with respect to the surrounding space in the case of an upright head position. In anatomy, the transverse plane of the head refers to the plane which is perpendicular to the longitudinal direction of the head and separates the lower half of the head from the upper half of the head.

By contrast, FIG. 3 shows the hearing instrument 2 in a plan view transversely to a vertical plane V. As evident from FIG. 2, the vertical plane V also intersects the concha portion 6 centrally and perpendicular to the horizontal plane H. In the intended wearing position of the hearing instrument 2 in the ear of the user, the vertical plane V is aligned approximately parallel to the coronal plane (also: frontal plane) of the head of the user, and hence aligned approximately vertically with respect to the surrounding space in the case of an upright head position. In anatomy, the coronal or frontal plane of the head refers to the plane which is parallel to the longitudinal direction of the head and separates the front half of the head from the back half of the head. The projection of the horizontal plane H and the vertical plane V respectively shown in FIGS. 2 and 3 also reproduces the position of the line of intersection of these two planes. Below, this line of intersection is also referred to as the central axis Z of the hearing instrument 2.

The concha portion 6 has a bulging shape to fit the typical shape of a human concha. The canal portion 8 has a thin and elongate shape to fit the typical anatomy of the human auditory canal (canal). In accordance with the typical, twice curved shape of the human auditory canal, the canal portion 8 has a first curvature located at least approximately in the horizontal plane H; said first curvature is indicated in FIG. 2 by a first angle W1. Further, the canal portion 8 has a second curvature located at least approximately in the vertical plane V; said second curvature is indicated in FIG. 3 by a second angle W2.

The housing 4 is formed from two assembled housing parts, specifically a housing trough 10 and a housing lid 12. The housing trough 10 forms a lower side 14 of the concha portion 6 which faces the head of the user in the intended wearing position of the hearing instrument 2. By contrast, the housing lid 12 forms an upper side 16 of the concha portion 6 which is distant from the head of the user in the intended wearing position of the hearing instrument 2. Both the housing trough 10 and the housing lid 12 also form a respective side of the canal portion 8. In a manner analogous to the two sides of the concha portion 6, the side of the canal portion 8 formed by the housing trough 10 is referred to as lower side 18 and the side of the canal portion 8 formed by the housing lid 12 is referred to as upper side 20. A connector 22 for connecting an ear dome is also formed on the lower side 18 of the canal portion 8. The ear dome (not depicted here) formed like an umbrella or funnel serves to fix the hearing instrument 2 in the auditory canal and fully or partly acoustically seal the inner auditory canal from the surroundings.

Figure 8:
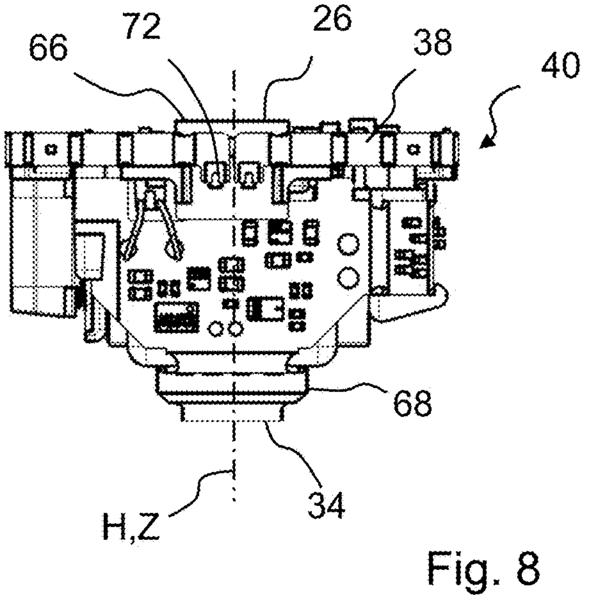
FIG. 8 shows the electronics unit according to FIG. 6 in a plan view transversely to the vertical plane.
Figure 9:
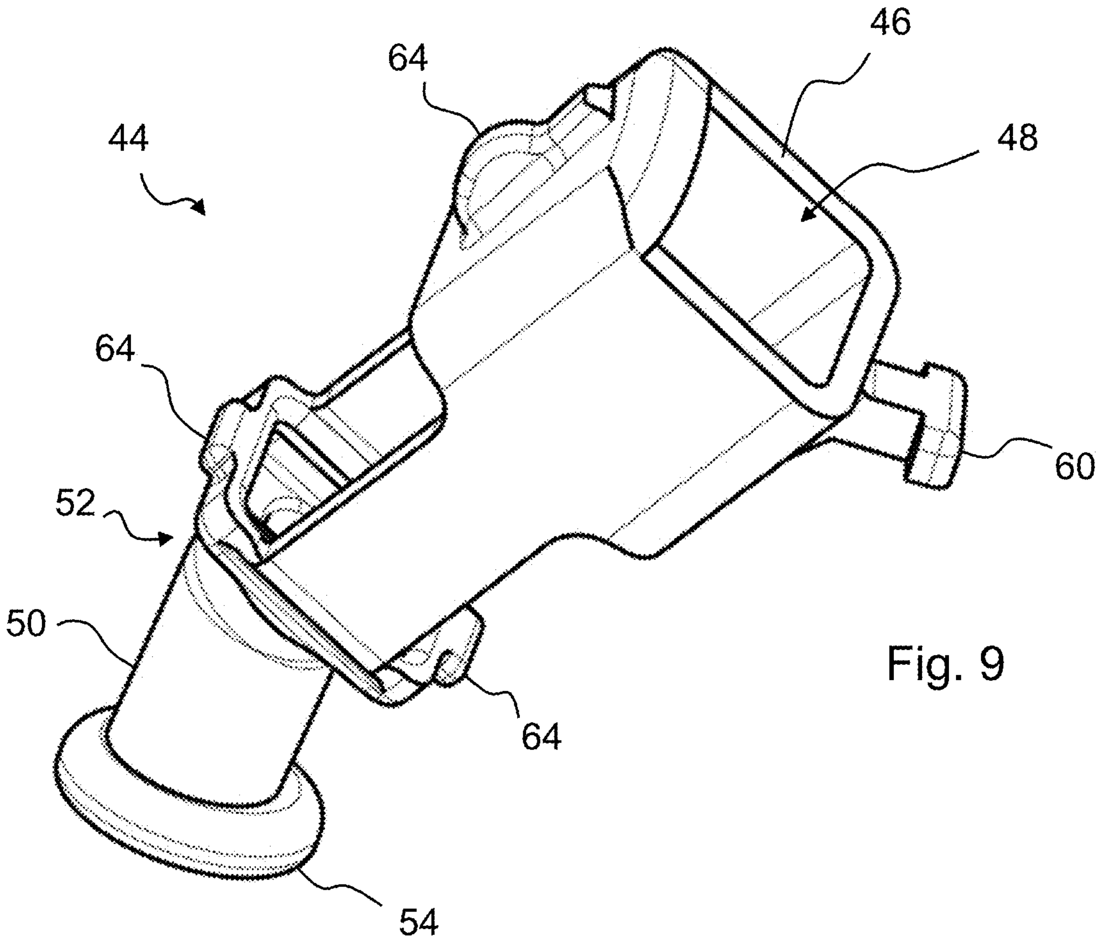
FIG. 9 shows a perspective illustration of a damping body of the hearing instrument according to FIG. 1 for accommodating a receiver.

In the assembled state according to FIGS. 1 to 3, the housing trough 10 and the housing lid 12 are fastened to one another in non-destructively detachable fashion by latching connections 24 (FIGS. 8 and 9).

Within the housing 4, the hearing instrument 2 according to FIGS. 4 to 8 and 13 and 14 comprises two microphones 26 as an input transducer and a receiver 28 as an output transducer. The hearing instrument 2 furthermore comprises a battery 30 and an (in particular digital) signal processor 32. Preferably, the signal processor 32 comprises both a programmable subunit (for example, a microprocessor) and a non-programmable subunit (for example, an ASIC). The signal processor 32 is supplied with a supply voltage from the battery 30.

During normal operation of the hearing instrument 2, the microphones 26 record airborne sound from the surroundings of the hearing instrument 2. The microphones 26 each convert the sound into an (input) audio signal which contains a piece of information about the recorded sound. Within the hearing instrument 2, the input audio signals are fed to the signal processor 32, which modifies these input audio signals to assist the ability of the user to hear. The signal processor 32 outputs an output audio signal, which contains a piece of information about the processed and hence modified sound, to the receiver 28. The receiver 28 converts the output sound signal into modified airborne sound. This modified airborne sound is then output into the auditory canal of the user.

The battery 30 is a rechargeable battery. To recharge the battery 30, the hearing instrument 2 in this case comprises a galvanic charging connector 34. In the example illustrated, this charging connector 34 is formed by a plug-in connector which is connected to an electronic charging controller (not depicted explicitly) of the hearing instrument 2. To charge the battery 30, the hearing instrument 2 is inserted into a corresponding receptacle of a charging device (not depicted here) such that the charging connector 34 of the hearing instrument 2 comes into contact with a corresponding mating plug-in connector of the charging device.

Moreover, within the housing 4, the hearing instrument 2 comprises an antenna 38 which enables a wireless data exchange between the hearing instrument 2 and at least one further electronic device, for example a further hearing instrument and/or a smartphone of the user. The antenna 38 is designed to transmit and receive electromagnetic waves, especially in the GHz range. In this case, the data transfer is preferably implemented on the basis of the Bluetooth standard.

The microphones 26, the battery 30, the signal processor 32, the charging connector 34, the charging controller and the antenna 38 are parts of an electronics unit 40 which is held together by an electronics frame 42 (formed by a plastic part in particular) as a rigid component. The electronics unit 40 also comprises an amplifier (not depicted explicitly), which amplifies the output audio signal output by the signal processor prior to the output by the receiver 28. The electronics unit 40 is inserted in the concha portion 6 of the housing 4 and substantially fills this concha portion 6.

The receiver 28 is not arranged in the electronics unit 40 but is located, spatially and mechanically separated from the latter, in the canal portion 8 of the housing 4. In this case, the receiver 28 is accommodated in a damping body 44 made of an elastic material, which acoustically damps the receiver 28 vis-à-vis the housing 4 and hence suppresses the transmission of the structure-borne sound generated by the receiver 28 (i.e., the mechanical vibration of the receiver 28 when the sound signal is output). The damping body 44 in particular has a hardness (Shore hardness SHA) of between 50 and 70 and for example consists of a fluoroelastomer (e.g., Viton/FKM).

According to FIG. 9, the damping body 44 comprises a pocket 46 into which the receiver 28 has been pushed through an open back longitudinal end 48 (see FIG. in particular). The pocket 46 preferably has slightly smaller dimensions than the receiver 28, and so the receiver 28 is frictionally secured by the elastic material of the pocket 46. In its assembled position in the housing 4, the damping body 44 with the inserted receiver 28 is pushed into the canal portion 8 in such a way that the longitudinal end 48 faces the concha portion 6 (see FIGS. 4 and 11 to 14). In a region distant from the longitudinal end 48, the pocket 46 is provided with two opposing cutouts which face the lower side 18 and upper side of the canal portion 8, respectively, in the assembled position. These cutouts save material, weight and installation space.

The damping body 44 also comprises a short tubular (and hence in particular hollow) sound tube 50, which is shaped in one piece on a front longitudinal end 52 of the pocket 46 which is opposite the longitudinal end 48. In the assembled position of the receiver 28, a sound outlet of the receiver 28 is arranged in the region of the front longitudinal end 52 of the pocket 46 such that the sound generated by the receiver 28 is output into the sound tube 50.

To reproduce the first curvature of the canal portion 8, the sound tube 50 is positioned on the pocket 46 in a manner obliquely to the longitudinal axis of the pocket 46—in a manner corresponding to the first angle W1. The second curvature of the canal portion 8 is not reproduced in full on the damping body 44. Instead, at its end distant from the pocket 46, the sound tube 50 terminates in a support plate 54, which is placed at an angle to the axis of the sound tube 50. By way of the support plate 54, the sound tube 50 rests all round on a shoulder 56 of the canal portion 8 (formed on an inner wall of the canal portion 8). As a result of the oblique alignment of the support plate 54, the sound tube 50 in this case extends obliquely—in a manner corresponding to the second angle W2—to the end of the canal portion 8 formed by the connector 22. As a result of the support plate 54 resting on the shoulder 56, the transition between the sound tube 50 of the damping body 44 and the connector 22 of the housing 4 is also acoustically sealed. In this case, the damping body 44 lies in the canal portion 8 in substantially stress-free fashion; in particular, it is not significantly compressed nor expanded nor bent nor twisted nor sheared in the assembly position.

As evident from FIGS. 9 to 12 in particular, the support plate 54 is broadened vis-à-vis the sound tube 50. It thus has an outer edge which projects beyond an outer circumference of the sound tube. As a result, the support plate 54 fills the hollow inner cross section of the canal portion 8 virtually completely in the region of the shoulder 56; however, the outer diameter of the support plate 54 preferably is slightly smaller (in particular by approx. 10%) than the locally corresponding inner diameter of the canal portion 8. Thus, the lower end of the damping body 44 is centered without further measures (self-centered) by the broadened support plate 54 in the canal portion 8 of the housing 4 without the damping body 44 being clamped or even compressed by the housing wall. Moreover, the sound tube 50 is guided at a distance from the housing wall all round.

Figure 10:
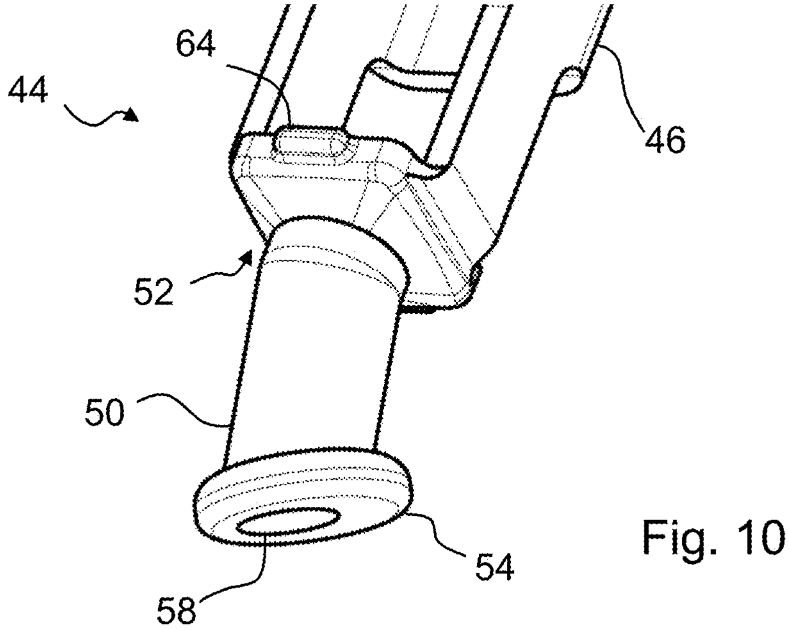
FIG. 10 shows a further perspective illustration of a sound tube of the damping body from FIG. 9.
Figure 11:
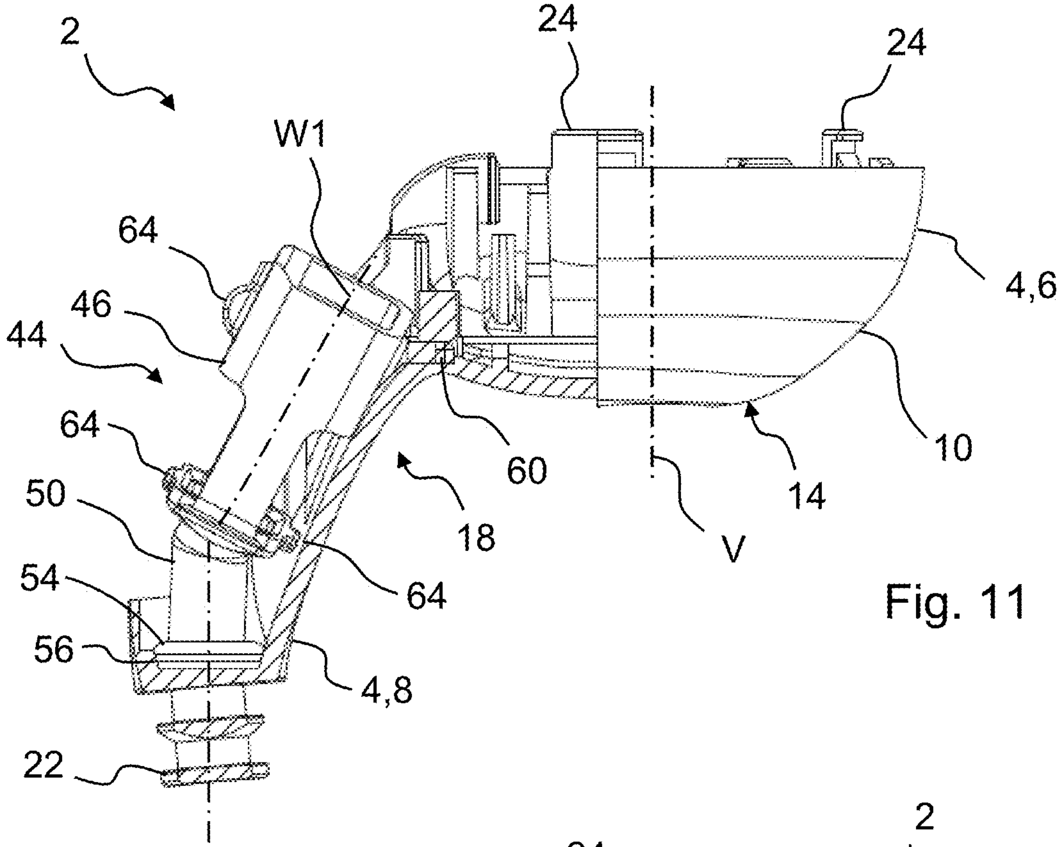
FIG. 11 shows, in an illustration according to FIG. 2, the hearing instrument therefrom with a removed housing lid, a housing trough depicted in cut open fashion, and the damping body inserted in the housing trough.
Figure 12:
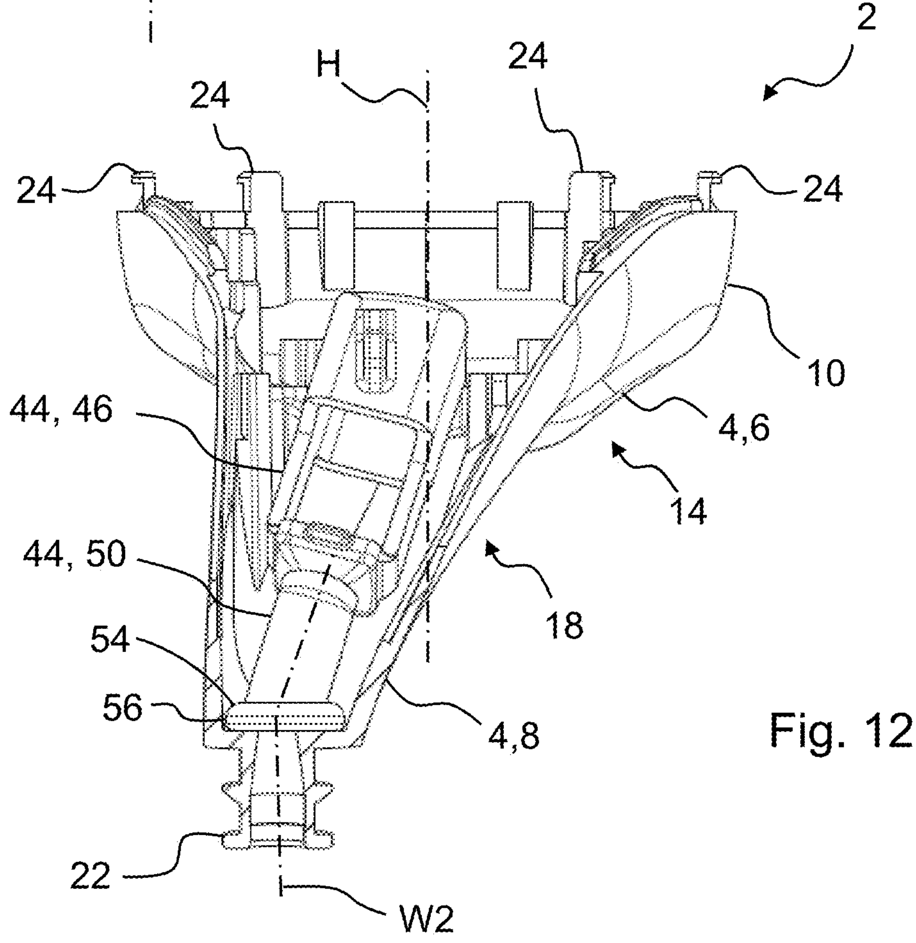
FIG. 12 shows, in an illustration according to FIG. 3, the hearing instrument therefrom with a removed housing lid, a housing trough depicted in cut open fashion, and the damping body inserted in the housing trough.

A sound channel 58 formed in the sound tube 50 passes through the support plate 54 off-center in accordance with FIG. 10 and opens substantially without transition into an adjoining sound channel of the connector 22.

In addition to the support on the housing 4 brought about by the support plate 54 resting on the shoulder 56, the damping body 44 is secured to the housing 4 only by way of a T-shaped retaining projection 60. To this end, the elastic retaining projection 60 shaped on the pocket 46 at the lower side of the longitudinal end 48 (consequently opposite to the support plate 54 and on the inner side in relation to the bend of the damping body 44) is pressed into a retaining contour 62 of the housing trough 10, which frictionally securely and interlockingly fixes the retaining projection 60. The retaining contour 62 preferably encloses a crossbar of the T-shaped holding projection 60 (i.e., the "roof" of the T shape) from both sides.

In its rest position, the damping body 44 is not in contact with the housing wall in the region between the retaining projection 60 and the support plate 54. However, the damping body 44 is additionally provided with a plurality of lugs 64 which project outwardly from the pocket 46 (specifically in the direction of the lower side 18 and the upper side 20 of the canal portion 8 in the assembled position), which are formed by the elastic material of the damping body 44 and which buffer the damping body 46 vis-à-vis the housing wall if said damping body is deflected more significantly from the rest position under the action of inward or outward accelerations. By preference, the lugs 64 are not in contact with the housing wall in the rest position and in the case of only minor deflections of the damping body 44 (FIG. 14).

As a result of the damping body 44 being fixed to the housing 4 only at the support plate 54 and the holding projection 60, it can move largely freely in the lateral direction (i.e., across its longitudinal direction).

The electronics unit 40 is connected to the concha portion 6 of the housing 4 only at three locations, specifically by way of two elastic sealing rings 66, which are each arranged flush with one of the two microphones 26 and inserted between the respective microphone 26 and the housing lid 12, and by way of a further elastic sealing ring 68, which surrounds the charging connector 34. The sealing rings 66 and 68 firstly serve to seal the interior of the housing 4 with regard to moisture, dirt and sound vis-à-vis the surroundings in the region of a respectively assigned housing opening (as a sound inlet for an assigned microphone 26 in each case or as an access opening for the charging connector 34). Additionally, the three sealing rings 66 and 68 serve as cushioning elements which effectively decouple the electronics unit 40 from vibrations transmitted via the housing 4 (in particular the structure-borne sound generated by the receiver 28). Thus, the electronics unit 40 is suspended virtually in floating fashion (i.e., without hard contact) in the concha portion 6 of the housing 4 by way of only the three connecting locations with the housing 4.

Figure 15:
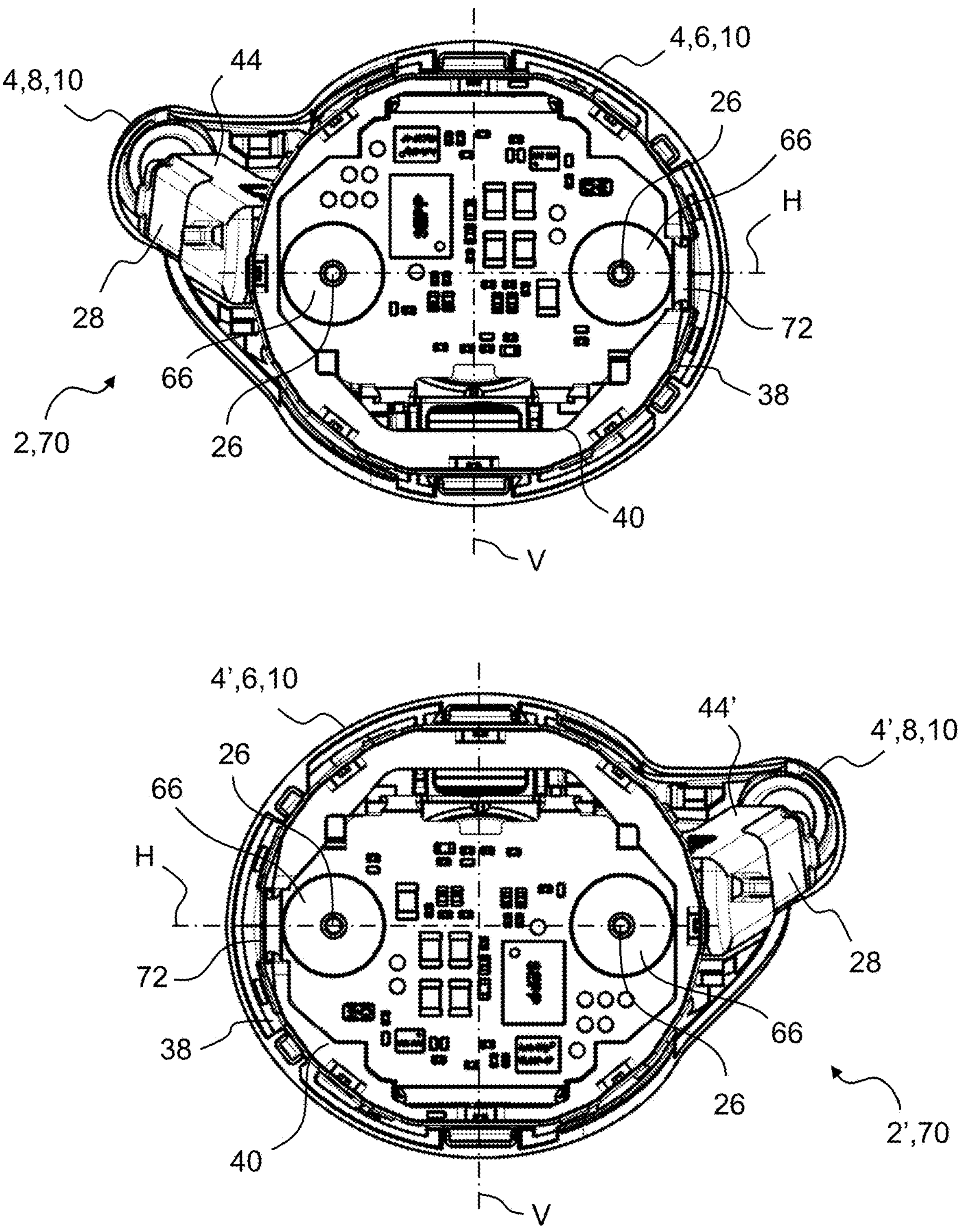
FIG. 15 shows, in an illustration according to FIG. 4, a binaural system having the hearing instrument according to FIG. 1 and a further hearing instrument for the right ear of the user.

FIG. 15 finally shows a binaural hearing aid system 70 which is formed by the hearing instrument 2 according to FIGS. 1 to 14 and a further hearing instrument 2' for the right ear of the user.

The hearing instrument 2' depicted in FIG. 15 without the housing lid has a housing 4' with a mirror symmetric embodiment (specifically reflected in the vertical plane V) in relation to the housing 4 of the hearing instrument 2. Additionally, the hearing instrument 2' also has a damping body 44' with a mirror symmetric design vis-à-vis the damping body 44 of the hearing instrument 2.

The remaining components, especially the receiver 28 and the electronics unit 40, have an identical embodiment in both hearing instruments 2 and 2'. However, the electronics unit 40 of the hearing instrument 2' is installed into the housing 4' in a pose that is rotated through 180° about the central axis Z (i.e., in the plane of the drawing of FIG. 15) in comparison with the electronics unit 40 of the hearing instrument 2.

Figure 4:
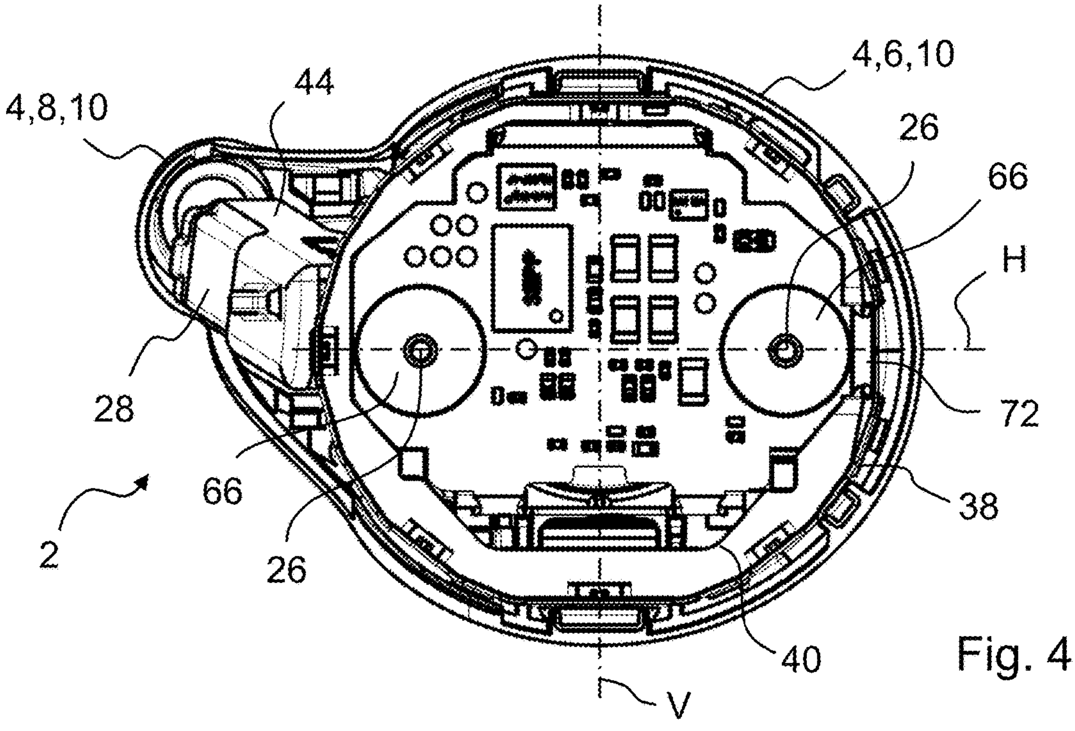
FIG. 4 shows a plan view of an upper side of the hearing instrument from FIG. 1 with a housing lid removed.
Figure 5:
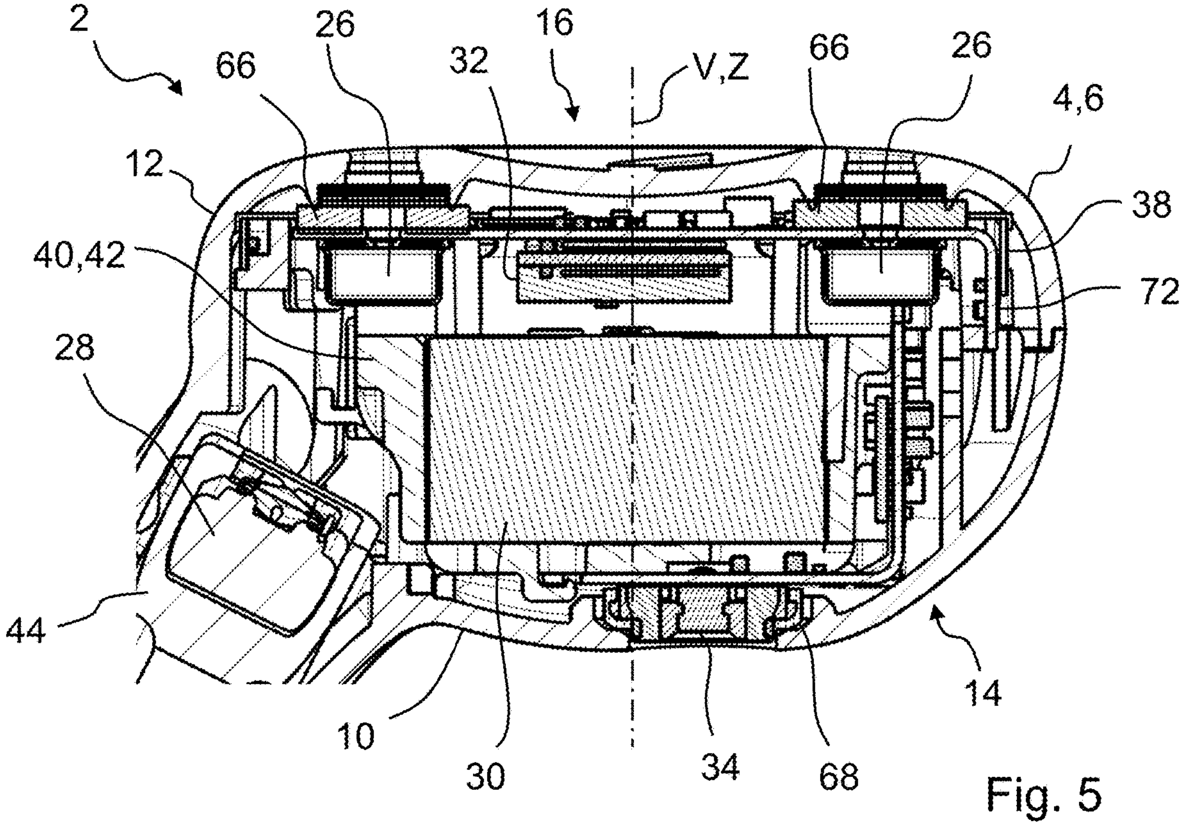
FIG. 5 shows the concha portion of the hearing instrument according to FIG. 1 in a cross section along the horizontal plane.
Figure 6:
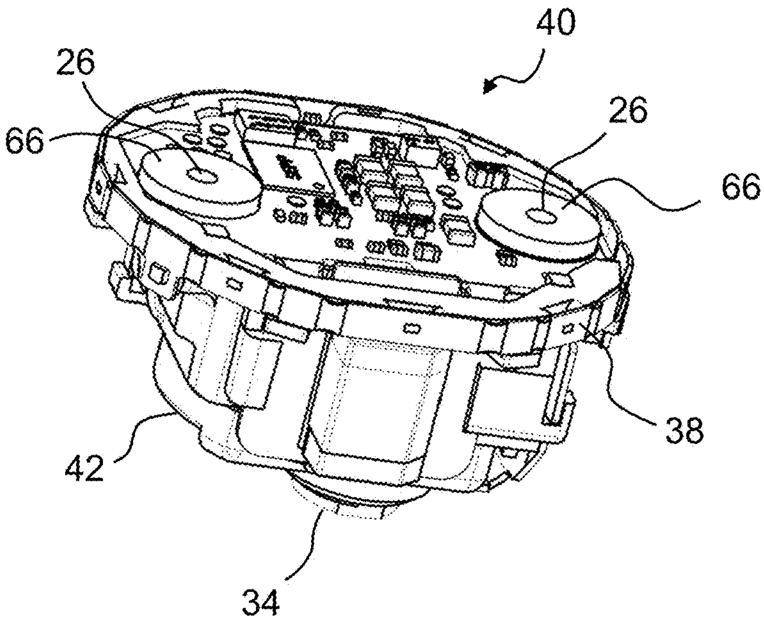
FIG. 6 shows a perspective illustration with a view on an upper side of a mechanically rigidly connected electronics unit of the hearing instrument according to FIG. 1, comprising two microphones, a signal processor, an amplifier, a battery, a galvanic charging connector and an antenna for wireless data transfer with an external electronic device.
Figure 7:
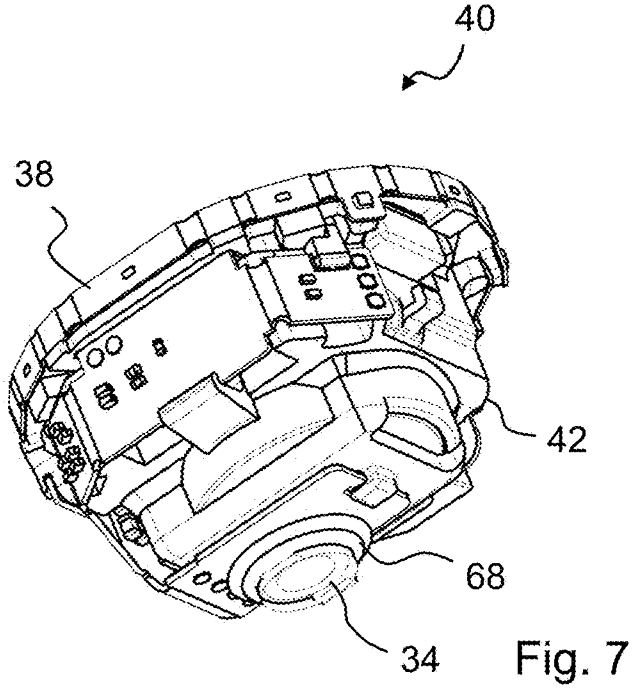
FIG. 7 shows a perspective illustration with a view of a lower side of the electronics unit according to FIG. 6.

The use of identical electronics units 40 for the left hearing instrument 2 and the right hearing instrument 2' is promoted by virtue of the fact that—as emerges from FIGS. 4 and 8 in particular—both microphones 26 are arranged in the horizontal plane H and centered in relation to the latter, with the result that the corresponding microphones 26 of both hearing instruments 2 and 2' have a corresponding pose and hence a corresponding spatial recording region in the wearing position on the left and right ear of the user, respectively. Moreover, the use of identical electronics units 40 for the left hearing instrument 2 and the right hearing instrument 2' is also promoted by virtue of the fact that a base point 72 (i.e., a central feed point) of the antenna 38 is also arranged on the electronics unit 40 in the horizontal plane H and centered in relation to the latter (see FIGS. 4 and 8). The effect obtained thereby is that the base points 72 of the antennas 38 in both hearing instruments 2 and 2' are arranged in an appropriate pose in the wearing position, whereby an appropriate emission characteristic is obtained for both antennas 38.

The invention becomes particularly clear on the basis of the exemplary embodiment described above; however, it is in no way restricted to this example and, instead, further exemplary embodiments of the invention can be derived within the scope of the claims from the description given above. In particular, the invention is not restricted to hearing aids but can be applied in general to hearing instruments wearable in the ear.

LIST OF REFERENCE SIGNS

- 2, 2' Hearing instrument
- 4, 4' Housing
- 6 Concha portion
- 8 Canal portion
- 10 Housing trough
- 12 Housing lid
- 14 Lower side
- 16 Upper side

18 Lower side
20 Upper side
22 Connector
24 Latching connection
26 Microphone
28 Receiver
30 Battery
32 Signal processor
34 Charging connector
38 Antenna
40 Electronics unit
42 Electronics frame
44, 44' Damping body
46 Pocket
48 (Back) longitudinal end
50 Sound tube
52 (Front) longitudinal end
54 Support plate
56 Shoulder
58 Sound channel
60 Retaining projection
62 Retaining contour
64 Lug
66 Sealing ring
68 Sealing ring
70 Hearing aid system
72 Base point
H Horizontal plane
V Vertical plane
W1 Angle
W2 Angle
Z Central axis

The invention claimed is:

1. An in-the-ear (ITE) hearing instrument, comprising:

a housing to be worn in an ear of a user, said housing including a concha portion and a canal portion protruding from said concha portion, said concha portion having a bulging shape configured to fit a typical shape of a human concha, said canal portion having a shape curved twice in different planes to fit to an anatomy of a human auditory canal;

a damping body inserted in said canal portion and being made of an elastic material for vibration-damping mounting of a receiver;

said damping body being formed with a pocket for accommodating the receiver and a sound tube adjoining said receiver;

said sound tube being angled at a first angle with respect to a longitudinal axis of said pocket, thereby forming a bend in said damping body;

an end of said sound tube distal from said pocket terminating in a support plate which rests on a shoulder of said canal portion, said support plate being broadened relative to said sound tube; and said support plate being angled obliquely with respect to an axis of said sound tube.

2. The hearing instrument according to claim 1, wherein an outer diameter of said support plate at least approximately matches a locally corresponding inner diameter of said canal portion, to self-center said sound tube in said canal portion.

3. The hearing instrument according to claim 1, wherein said sound tube is formed with a sound channel which passes through said support plate in an off-center relationship.

4. The hearing instrument according to claim 1, wherein said damping body comprises a retaining projection at a longitudinal end of said pocket distal from said sound tube, said retaining projection being retained in a retaining contour of said housing for mounting said damping body to said housing.

5. The hearing instrument according to claim 1, which comprises an outwardly projecting lug formed on said pocket and permanently resting against an inner wall of said housing for damping deflections of said damping body relative to said housing or striking an inner wall of said housing when said damping body is deflected relative to said housing.

6. The hearing instrument according to claim 5, wherein said damping body is retained in the housing with said lug being spaced apart from the inner wall of said housing in a rest position of said damping body.

7. The hearing instrument according to claim 6, wherein said lug is one of a plurality of lugs formed at said pocket, and each of said lugs is spaced apart from the inner wall of said housing in the rest position of said damping body.

8. The hearing instrument according to claim 4, wherein said retaining projection has a T-shape.

9. The hearing instrument according to claim 4, wherein said retaining projection is shaped on said pocket on an inner side relative to the bend of said damping body.

10. The hearing instrument according to claim 1, wherein said pocket of said damping body has slightly smaller dimensions than said receiver (28) and, with said receiver pushed into said pocket under force, said receiver is frictionally secured in said pocket by the elastic material of said pocket.

11. The hearing instrument according to claim 1, wherein said housing is formed from two assembled housing parts, with said two housing parts each forming a part of said concha portion and a part of said canal portion.

12. A binaural hearing aid system, comprising:

a first hearing instrument for a left ear of a user; and a second hearing instrument for a right ear of a user;

wherein each of said first hearing instrument and said second hearing instrument is a hearing instrument according to claim 1.

* * * * *